United States Patent
Zwaal et al.

(10) Patent No.: US 10,075,372 B2
(45) Date of Patent: *Sep. 11, 2018

(54) SESSION INITIATION PROTOCOL STACK OPTIMISATION

(71) Applicant: Telefonaktiebolaget L M Ericsson (publ), Stockholm (SE)

(72) Inventors: Frederik Zwaal, PW Breda (NL); Erik Reitsma, Zoetermeer (NL)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 254 days.

This patent is subject to a terminal disclaimer.

(21) Appl. No.: 14/470,995

(22) Filed: Aug. 28, 2014

(65) Prior Publication Data

US 2014/0369357 A1 Dec. 18, 2014

Related U.S. Application Data

(63) Continuation of application No. 12/808,187, filed as application No. PCT/EP2007/064092 on Dec. 17, 2007, now Pat. No. 8,838,705.

(51) Int. Cl.
*H04L 12/741* (2013.01)
*H04L 29/06* (2006.01)

(52) U.S. Cl.
CPC ............ *H04L 45/74* (2013.01); *H04L 65/104* (2013.01); *H04L 65/1006* (2013.01); *H04L 69/08* (2013.01); *H04L 69/22* (2013.01)

(58) Field of Classification Search
CPC ... H04L 45/74; H04L 65/1006; H04L 65/105; H04L 69/08; H04L 69/22
See application file for complete search history.

(56) References Cited

U.S. PATENT DOCUMENTS

| | | | |
|---|---|---|---|
| 6,807,173 B1 | 10/2004 | Lee et al. | |
| 6,937,597 B1 | 8/2005 | Rosenberg et al. | |
| 7,142,534 B1 * | 11/2006 | Whent | H04L 29/06027 370/389 |
| 7,142,537 B2 | 11/2006 | Shores et al. | |
| 7,243,162 B2 * | 7/2007 | O'Neill | H04L 29/12009 709/228 |
| 7,752,315 B2 | 7/2010 | Da Palma et al. | |

(Continued)

FOREIGN PATENT DOCUMENTS

WO 2005011175 A2 2/2005

OTHER PUBLICATIONS

Baixas, "SEAS Module", VozTelecom Sistemas, Dec. 22, 2006, pp. 1-23, Retrieved from the Internet: URL: http://www.kamailio.org/docs/modules/1.2.x/seas.html.

(Continued)

*Primary Examiner* — Ian N Moore
*Assistant Examiner* — Latresa McCallum
(74) *Attorney, Agent, or Firm* — Coats & Bennett, PLLC

(57) ABSTRACT

Apparatus comprising a Session Initiation Protocol agent arranged to send and receive Session Initiation Protocol messages to and from peer Session Initiation Protocol agents. The apparatus is configured, for a Session Initiation Protocol message to be sent, to translate one or more header fields of the message into an alternative format and to include the translated field(s) within or prefixed to the message, together with the untranslated field(s).

20 Claims, 6 Drawing Sheets

(56) References Cited

U.S. PATENT DOCUMENTS

| | | | |
|---|---|---|---|
| 2003/0041110 A1* | 2/2003 | Wenocur | G06Q 10/107 |
| | | | 709/206 |
| 2003/0046404 A1* | 3/2003 | O'Neill | H04L 29/12009 |
| | | | 709/228 |
| 2003/0217031 A1* | 11/2003 | Owen | G06F 11/1004 |
| 2006/0268857 A1* | 11/2006 | Bessis | H04L 49/90 |
| | | | 370/389 |
| 2007/0242659 A1 | 10/2007 | Cantu et al. | |
| 2008/0170563 A1* | 7/2008 | Zhu | H04L 29/06027 |
| | | | 370/352 |
| 2008/0205330 A1* | 8/2008 | Stadler | H04L 69/04 |
| | | | 370/328 |

OTHER PUBLICATIONS

Rosenberg J et al: "SIP: Session Initiation Protocol" IETF Standard, Internet Engineering Task Force, IETF, CH, Jun. 2002, pp. 1-269, XP015009039.

\* cited by examiner

| From: | Initiator of the request; URI and optional display name (both variable length strings) |
|---|---|
| To: | Recipient of the request; URI and optional display name (both variable length strings) |
| Max-Forwards: | Maximum number of allowed forwards; 8-bit integer |
| Call-ID: | Uniquely identifies a particular or all registrations of a particular client; variable length string |
| CSeq: | Sequence number; 32-bit integer and type of request |
| Date: | Timestamp (date and time); various formats allowed |

Figure 1

```
INVITE sip:bob@biloxi.com SIP/2.0
Via: SIP/2.0/UDP pc33.atlanta.com;branch=z9hG4bKnashds8
Max-Forwards: 70
To: Bob <sip:bob@biloxi.com>
From: Alice <sip:alice@atlanta.com>;tag=1928301774
Call-ID: a84b4c76e66710
CSeq: 314159 INVITE
Contact: <sip:alice@oc33.atlanta.com>
Content-Type: application/sdp
Content-Length: 142
<sdp>
```

Figure 2

SESSION INITIATION PROTOCOL STACK OPTIMISATION

PRIORITY CLAIM

This application is a continuation of, and claims priority to, U.S. patent application Ser. No. 12/808,187, titled "Session Initiation Protocol Stack Optimisation," filed Sep. 13, 2010 and issued on Sep. 16, 2014 as U.S. Pat. No. 8,838,705, which was a U.S. National Stage filing of PCT application WO 2009/077003, titled "Session Initiation Protocol Stack Optimisation," filed Dec. 17, 2007, both of which are incorporated herein by reference in their entireties.

TECHNICAL FIELD

The present invention relates to a method and apparatus for optimising the handling of Session Initiation Protocol messages within the Session Initiation Protocol stack at network nodes.

BACKGROUND

The Session Initiation Protocol (SIP) is a text-based protocol specified by the Internet Engineering Task Force (IETF) in RFC 3261, similar to Hypertext Transfer Protocol (HTTP) and Simple Mail Transfer Protocol (SMTP), for initiating interactive communication sessions between users. Such sessions include voice, video, chat, interactive games, and virtual reality. A key objective in the development of SIP was simplicity and the reuse of existing Internet mechanisms. Not only is SIP text based (where individual characters are encoded using the 8-bit UCS/Unicode Transformation Format (UTF-8) character set), at least the header portions of SIP messages are essentially human readable to simplify the message creation and debugging processes.

SIP messages are handled by SIP agents. A SIP agent may be present at a user terminal or at a network-based node, in particular at SIP proxies and SIP Application Servers (ASs). A particular SIP agent receiving a SIP message might in some cases only need to look at one or a small number of fields within a SIP message in order to handle a message, for example it may only need to look at the "To" field which contains a destination SIP address.

The human readable format of SIP message headers makes the parsing of messages at network nodes incorporating a SIP agent, a computationally difficult process. Parsing involves searching and interpreting the header for particular text strings, e.g. in order to identify the address or Universal Resource Identifier (URI) of the called party (e.g. "sip:bob@biloxi.com"). The problem is compounded by the fact that SIP does not specify a field order within the SIP header. Parsing is a particular problem in communication networks such as the IP Multimedia Subsystem (IMS) specified by 3GPP for the provision of multimedia services to mobile subscribers, where a message may pass though a large number of SIP nodes and be parsed separately at each, e.g. at a Call Session Control Function (CSCF) or SIP Application Server (AS). On some occasions it may even be necessary to parse a message multiple times within the same node (e.g. at different components within the node). This could be the case, for example, where multiple SIP servlets within multiple application server instances are deployed at the same node. It might also be the case when a SIP agent is implemented using components written in different programming languages (e.g. C++ and Java), so that the components cannot reuse each others parsing result. This could easily happen when third party software is used, or during other integration activities. In any case, the computational overhead introduced by handling messages within the SIP stack can be considerable, giving rise to resource problems particularly at nodes handling a high volume of SIP message traffic.

SUMMARY

It is an object of the present invention to reduce the processing overhead associated with the handling of SIP messages at a SIP node. This object is achieved by introducing into a SIP message, or appending thereto, code which is in a machine-friendly format and which is either a translation of one or more text-based fields or points to the relevant fields.

According to a first aspect of the present invention there is provided apparatus comprising a Session Initiation Protocol agent arranged to send and receive Session Initiation Protocol messages to and from peer Session Initiation Protocol agents, characterised in that the apparatus is configured, for a Session Initiation Protocol message to be sent, to translate one or more header fields of the message into an alternative format and to include the translated field(s) within or prefixed to the message, together with the untranslated field(s).

It will be appreciated that a SIP node receiving a message constructed in accordance with the present invention does not have to perform the computationally intensive process of parsing all text fields of the message in order to identify information required to handle the message. The relevant information is easily extracted using the machine-friendly header.

Preferably, the translated fields have a structured format, i.e. the fields have a fixed (byte) size and a fixed location. This makes it relatively easy for a processor at a receiving SIP node to identify a relevant field without having to parse large portions of the message.

According to a second aspect of the present invention there is provided apparatus comprising a Session Initiation Protocol agent arranged to send and receive Session Initiation Protocol messages to and from peer Session Initiation Protocol agents, characterised in that the apparatus is configured, for a received Session Initiation Protocol message, to identify a translated header field(s) data portion within or prefixed to the message and to handle the message according to that data without reference to the corresponding untranslated header field(s).

According to a third aspect of the present invention there is provided a method of handling Session Initiation Protocol messages within a communications network, characterised in that the method comprises, at a sending Session Initiation Protocol agent, translating one or more header fields of a Session Initiation Protocol message into a translated format, including the translated data in the message or prefixing it to the message, sending the message to a peer Session Initiation Protocol agent and, upon receipt of the message at the peer agent, handling the message according to the translated data without reference to the corresponding untranslated header field(s).

According to a fourth aspect of the present invention there is provided apparatus comprising a Session Initiation Protocol agent arranged to send and receive Session Initiation Protocol messages to and from peer Session Initiation Protocol agents, characterised in that the apparatus is configured, for a Session Initiation Protocol message to be sent, to include in the message a pointer or pointers to one or more header fields of the message.

According to a fifth aspect of the present invention there is provided apparatus comprising a Session Initiation Protocol agent arranged to send and receive Session Initiation Protocol messages to and from peer Session Initiation Protocol agents, characterised in that the apparatus is configured, for a received Session Initiation Protocol message, to identify a pointer or pointers contained within or prefixed to the message, to locate a header field or fields within the message using the pointer(s), and to handle the message according to the located header field(s).

According to a sixth aspect of the present invention there is provided a method of handling Session Initiation Protocol messages within a communications network, characterised in that the method comprises, at a sending Session Initiation Protocol agent, including in or prefixing to the message a pointer or pointers to one or more header fields of the message, sending the message to a peer Session Initiation Protocol agent and, upon receipt of the message at the peer agent, locating a header field or fields within the message using the pointer(s), and handling the message according to the located header field(s).

BRIEF DESCRIPTION OF THE DRAWINGS

FIG. 1 illustrates schematically various SIP header fields;

FIG. 2 shows an exemplary SIP header;

DETAILED DESCRIPTION

A Session Initiation Protocol (SIP) message contains a number of header fields and optionally a body containing the payload (which might conform to the Session Description Protocol). Whilst some of these fields are optional, others are mandatory (typically dependent on the type of SIP request). All of the header fields are encoded in a human-readable form and some even allow for multiple different encodings (e.g. timestamps).

According to the conventional approach, even though SIP proxies (which help route requests to a user's current location, authenticate and authorize users for services, implement provider call-routing policies, and provide features to users) and services may use only a fraction of the available header fields, it remains necessary to parse the complete header as the recipient does not necessarily know what the message contains and where various components are located. It is proposed here to modify the SIP message to include certain "essential" header information in a machine-friendly fashion, in addition to the usual text format data. For example, some header fields can be translated into a 32-bit or 64-bit data word, or as a single bit in a data word, with the translation being included in the header. Other header fields, such as variable length strings, may be represented by a pointer in machine-friendly form to the location and size of the actual textual data. Rather than being unstructured, as is the case for the normal SIP header fields, the translated data/pointer is structured, e.g. the data components have a fixed size and position or fields are preceded by a tag and field length identifier, e.g. Type, Length, Value/Abstract Syntax Notation One (TLV/ASN.1 format).

Figure 3:
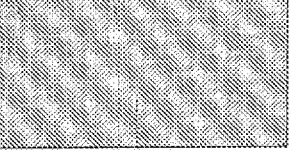
FIG. 3 illustrates schematically an exemplary machine readable header abstract for incorporation within a SIP message.

FIG. 1 illustrates a number of header fields that might be contained within a SIP message header including From, To, Max-Forwards, Call-ID, Cseq, and Date fields. FIG. 2 illustrates an exemplary SIP message containing entries in each of these fields. The From and To fields both contain a SIP Universal Resource Identifier (URI) and a "friendly" display name: both might be relevant for a SIP agent and so both will be made available within a machine readable abstract in the form of an offset/length pair (two 16-bit numbers). The Max-Forwards field can be represented using a single byte. The Call-ID field can be best represented as an offset/length pair (two 16-bit numbers), whilst the CSeq field contains two parts: the sequence number can be represented as a 32-bit data word whereas the type of request can be represented as an enumerated type (enum-type: that is a code representing the actual value of the field) that is contained in a single byte. Finally, the Date field can be represented as a standard UNIX date, i.e. a 32-bit number indicating the number of seconds since midnight on the 1$^{st}$ of Jan. 1970 (for future-proofness a 64-bit number could be used). FIG. 3 illustrates an example machine readable abstract structure for inclusion within a SIP message, broken into separate bytes, where the size of the abstract is 22 (or 24) bytes.

The SIP abstract may be included within a SIP message as a separate body part, in addition to any SDP body part. The possibility of so-called multipart message bodies within a SIP message containing a single SIP header is provided for in IETF RFC2045. If the original message contains only a non-multipart body, the abstract is included as the first part in a new multipart body. In order to further accelerate the locating of the abstract within a SIP message, an extra header field (e.g. X-AbstractOffset) can be included within the header. This defines the byte offset of the abstract within the message. This new header field should be included as the first header field to minimise the resources required to parse the message. The extra header is of course optional, and can be specified in the relevant SIP standard. An advantage of this approach is that it is backwards compatible with existing SIP messages. A disadvantage is that, as SIP agents are not required to support multi-part bodies, not all SIP agents will be able to support these messages.

An alternative approach involves including the SIP abstract within an extra header field (X-Abstract). Since not all characters are allowed in the field (e.g. carriage return and line feed characters), it must be encoded with some encoding mechanism (e.g. Base64). A SIP agent receiving a SIP message constructed according to this approach needs to first parse the header to identify the extra header field and then pass the contents of the field through an appropriate decoder to recover the abstract. Although a parsing step is required, this is significantly less complex than having to parse the header for multiple header fields. An advantage of this approach is that it is fully backwards compatible with existing SIP messages, so that any SIP agent will be able to parse it. It does however add extra computation cost in terms of the encoding process.

In a still further alternative approach, the SIP abstract is prefixed to the SIP message, i.e. placed at the head of the message. It is therefore directly accessible without any parsing effort. Since the message format is not backwards compatible (SIP agents must be aware of each other's capabilities for dealing with the abstract), an additional port can be defined and at which a SIP agent expects to receive these enveloped SIP messages. The normal SIP port can still be available in a SIP compatible manner.

It will be readily appreciated that the approach described here reduces the computational cost of parsing SIP messages on many occasions. This is particularly the case when only a few basic header fields need to be processed at a node before forwarding the unmodified message (as is typical in many SIP proxies or services). The approach impacts only on the parsing and construction of SIP messages. The actual handling of the content is not affected. This means that all existing software for using SIP messages is not affected, as long as the parsing code and message generating code are separated from the message handling code (which is often the case). If this is indeed the case, the message handling code is unaffected by the change.

It will be appreciated that messages incorporating the new machine-friendly abstract can still be handled by nodes containing only legacy parsing and message generating code. As the messages still retain the text-format SIP header fields, the message can be parsed in the conventional way. The machine-friendly abstract is ignored by the legacy code.

Figure 4:
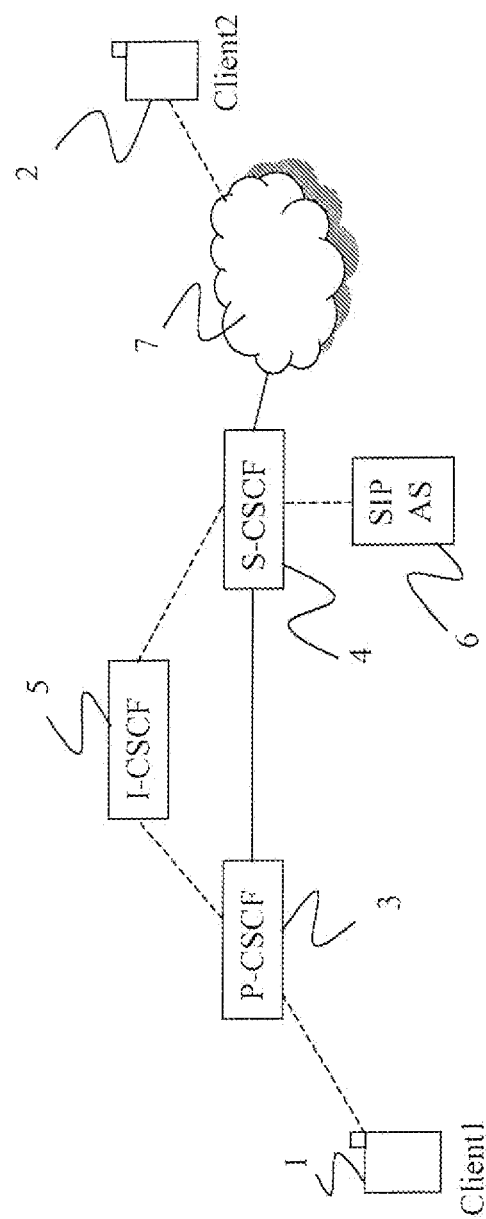
FIG. 4 illustrates schematically a simplified IMS network architecture.

FIG. 4 illustrates a simple IMS network comprising a number of peer SIP agents (i.e. agents which communicate at a common protocol layer). A first client terminal (i.e. a terminal which obtains services from the IMS network) Client1 1 is able to establish a (multimedia or other) call to a second client terminal Client2 2. On Client1's side of the IMS network, SIP messages pass through Proxy-Call Session Control Function, P-CSCF 3, Serving-Call Session Control Function, S-CSCF 4, and Interrogating-Call Session Control Function, I-CSCF 5 SIP proxies. In some cases messages are routed through one or more SIP ASs 6. Messages may also pass through further SIP proxies and ASs on the Client2 side of the IMS network 7.

Figure 5:
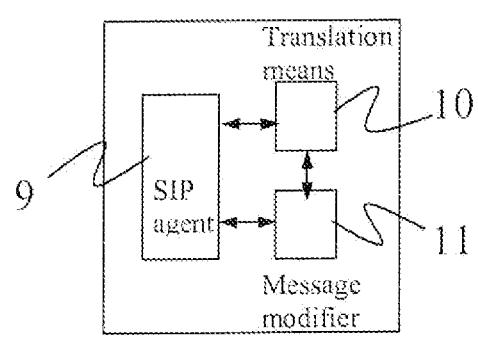
FIG. 5 illustrates schematically a SIP node embodying the present invention.

FIG. 5 illustrates schematically a SIP node comprising a SIP agent 9, translation means 10, and SIP message modifier 11. Considering Client1 as the sending SIP node, the translation means 10 translates relevant portions of the header to create the machine-readable abstract, whilst the SIP message modifier 11 incorporates the translated information into the SIP message to be sent. The translation means 10 also operates on incoming SIP messages to recover relevant header data from any machine-readable abstract contained within the message, and passes the data to the relevant applications. Similar functions may be implemented at Client2 and at the network nodes. In the case where the message is modified to include a machine-readable pointer to relevant fields of the SIP header, the translation means is responsible for generating these pointers.

Figure 6:
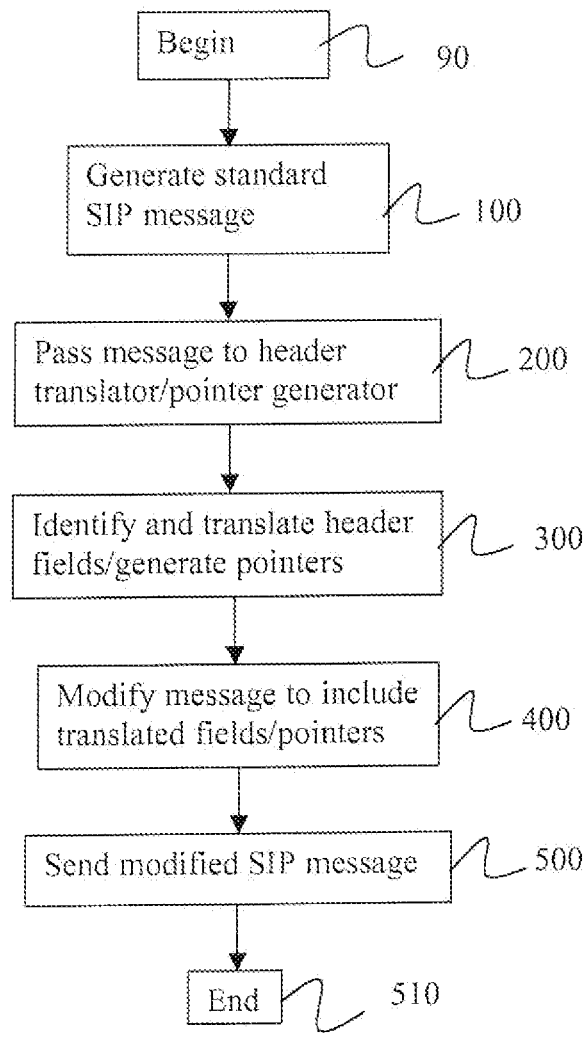
FIG. 6 is a flow diagram illustrating a process for handling messages to be sent from a SIP node.
Figure 7:
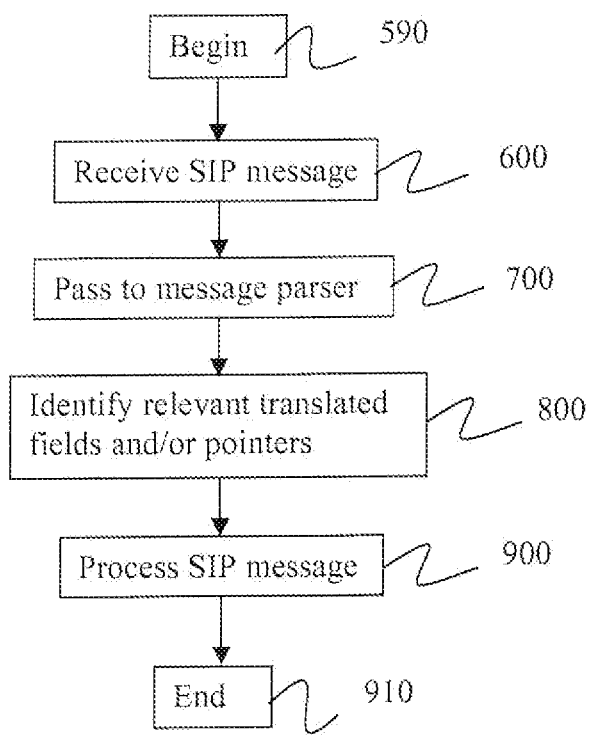
FIG. 7 is a flow diagram illustrating a process for handling messages received at a SIP node.

FIGS. 6 and 7 are flow diagrams illustrating methods for handling messages to be sent from a SIP node and for handling messages received at a SIP node respectively.

It will be appreciated by the person of skill in the art that various modifications may be made to the above described embodiments without departing from the scope of the present invention. According to one modification, a node sending a SIP message may include both a translation of one or more SIP header fields and a pointer or pointers to untranslated fields.

The invention claimed is:
1. A network node comprising:
communication circuitry configured to exchange signals with a network;
processing circuitry communicatively coupled to the communication circuitry and configured to:

receive, via the network, a Session Initiation Protocol (SIP) message comprising a SIP header;
add a description of the SIP header into a body of the SIP message, wherein the description and a Session Description Protocol (SDP) body part received in the body of the SIP message are comprised in the body as distinct parts of a multipart body of the SIP message as a result of the adding, the description comprising an offset field and a length field indicating a position and a size, respectively, of a text string in the SIP header;
transmit, via the network, the SIP message with the description added.

2. The network node of claim 1, wherein the processing circuitry is further configured to add a field into the SIP header, the field comprising a pointer to a position of the description within the SIP message.

3. The network node of claim 2, wherein the pointer comprises a start location and a data block size.

4. The network node of claim 1, wherein the processing circuitry is further configured to translate text in the SIP header that represents an integer value into a fixed-length data word and include the fixed-length data word in the description.

5. The network node of claim 4, wherein to translate the text representing the integer value into the fixed-length data word, the processing circuitry is configured to translate the text representing the integer value into a Base64 encoding.

6. The network node of claim 4:
wherein the text string is a value of a From, To, or Call-ID SIP header field;
wherein the text that represents the integer value is a value of a Max Forwards or Cseq SIP header field.

7. The network node of claim 1, wherein to transmit the SIP message with the description added, the processing circuitry is configured to transmit the SIP message to a non-standard SIP port.

8. The network node of claim 1, wherein the network node is a network element selected from the group consisting of a user terminal, a SIP proxy, and a SIP Application Server.

9. The network node of claim 1, wherein the description has a fixed, predetermined size and is comprised in the SIP message at a predetermined position.

10. The network node of claim 1, wherein the processing circuitry is further configured to translate text in the SIP header that represents a date into an integer number of time units since a predefined date and include the integer number of time units in the description.

11. The network node of claim 1, wherein the processing circuitry is further configured to translate text in the SIP header that represents a type of request into a single byte code and include the single byte code in the description.

12. A network node comprising:
communication circuitry configured to exchange signals with a network; processing circuitry communicatively coupled to the communication circuitry and configured to:
receive, via the network, a Session Initiation Protocol (SIP) message comprising a SIP header and a body comprising a description of the SIP header and a Session Description Protocol (SDP) body part as distinct parts of a multipart body of the SIP message, the description comprising an offset field and a length field indicating a position and a size, respectively, of a text string in the SIP header;

handle the SIP message by using the offset and length fields in the body to extract the text string from the SIP header.

13. The network node of claim 12, wherein the network node is a network element selected from the group consisting of a user terminal, a SIP proxy, and a SIP Application Server.

14. The method of claim 12, wherein the description has a fixed, predetermined size and is comprised in the SIP message at a predetermined position.

15. A method of handling a Session Initiation Protocol (SIP) message within a communications network, comprising, at a sending SIP agent:
adding, into a body of a SIP message, a description of a SIP header of the SIP message, wherein the description and a Session Description Protocol (SDP) body part received in the body of the SIP message are comprised in the body as distinct parts of a multipart body of the SIP message as a result of the adding, the description comprising an offset field and a length field indicating a position and a size, respectively, of a text string in the SIP header;
sending the SIP message with the description added to a peer SIP agent via the communications network.

16. The method of claim 15, wherein the description has a fixed, predetermined size and is comprised in the SIP message at a predetermined position.

17. The method of claim 15, further comprising translating text in the SIP header that represents a date into an integer number of time units since a predefined date and including the integer number of time units in the description.

18. The method of claim 15, further comprising translating text in the SIP header that represents a type of request into a single byte code and including the single byte code in the description.

19. A method of handling a Session Initiation Protocol (SIP) message within a communications network, comprising, at a receiving SIP agent:
receiving, via the communications network, a SIP message comprising a SIP header and a body comprising a description of the SIP header and a Session Description Protocol (SDP) body part as distinct parts of a multipart body of the SIP message, the description comprising an offset field and a length field indicating a position and a size, respectively, of a text string in the SIP header;
handling the SIP message by using the offset and length fields in the body to extract the text string from the SIP header.

20. The method of claim 19, wherein the description has a fixed, predetermined size and is comprised in the SIP message at a predetermined position.

* * * * *

UNITED STATES PATENT AND TRADEMARK OFFICE
CERTIFICATE OF CORRECTION

| | |
|---|---|
| PATENT NO. | : 10,075,372 B2 |
| APPLICATION NO. | : 14/470995 |
| DATED | : September 11, 2018 |
| INVENTOR(S) | : Zwaal et al. |

It is certified that error appears in the above-identified patent and that said Letters Patent is hereby corrected as shown below:

On the Title Page

Item (72), under "Inventors", in Column 1, Line 1, delete "Frederik Zwaal," and insert
-- Frederik Hugo Zwaal, --, therefor.

Signed and Sealed this
Second Day of April, 2019

Andrei Iancu
*Director of the United States Patent and Trademark Office*